United States Patent [19]

Harris et al.

[11] 4,215,095

[45] Jul. 29, 1980

[54] PROCESS FOR THE INCINERATION OF CHLORINATED ORGANIC MATERIALS

[75] Inventors: Alexander T. Harris, Metairie, La.; Charles R. Putman, New Albany, Ind.

[73] Assignee: E. I. Du Pont de Nemours and Company, Wilmington, Del.

[21] Appl. No.: 954,297

[22] Filed: Oct. 23, 1978

[51] Int. Cl.² .............................................. B01D 53/34
[52] U.S. Cl. .................. 423/240; 423/241; 423/481; 423/486; 423/488
[58] Field of Search ............... 423/240, 241, 481, 488, 423/486

[56] References Cited

U.S. PATENT DOCUMENTS

| | | | |
|---|---|---|---|
| 3,140,155 | 7/1964 | Cull et al. | 423/481 X |
| 3,305,309 | 2/1967 | Woodland et al. | 423/481 X |
| 3,485,577 | 12/1969 | Klaus | 423/481 X |
| 4,018,879 | 4/1977 | Winnen | 423/481 |

Primary Examiner—Earl C. Thomas

[57] ABSTRACT

Molecular chlorine level in flue gases from incineration of chlorinated organic materials is reduced by injecting into the incinerator's quench zone an amount of a $C_1$-$C_4$ hydrocarbon which depends on the amount of air fed into the combustion zone, the amount of air being such that there is a 1–40 % excess of oxygen. When the wall temperature of the combustion zone is about 800°–1500° C., the temperature at which the hydrocarbon is added to the quench zone is about 450°–1000° C. Hydrogen chloride, which is formed from molecular chlorine and hydrocarbon, is more readily water-scrubbed than chlorine, so that less polluting flue gases are obtained.

7 Claims, 1 Drawing Figure

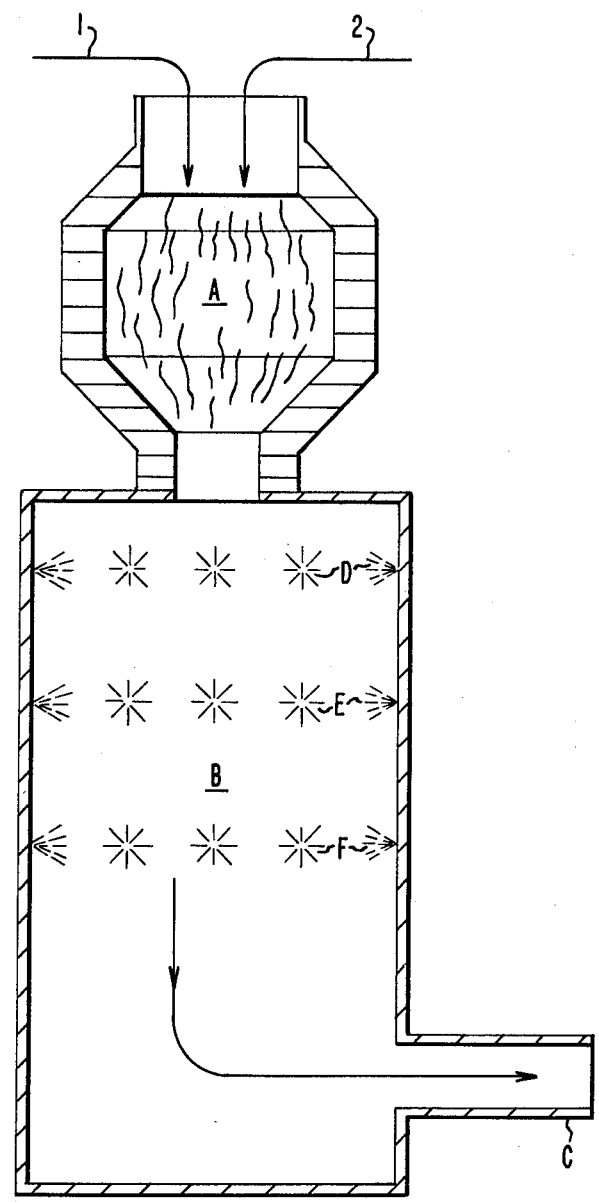

PROCESS FOR THE INCINERATION OF CHLORINATED ORGANIC MATERIALS

BACKGROUND OF THE INVENTION

This invention relates to an improved process for incinerating chlorinated organic materials, particularly to a method of reducing the level of molecular chlorine in flue gases.

Unwanted chlorinated organic compounds often are formed side by side with useful chlorinated products in many industrial processes. Thus, for example, highly chlorinated butane derivatives and chloroprene polymerization products are obtained as byproducts in chloroprene manufacture. Inactive isomers are formed together with the desired products in the manufacture of chlorinated pesticides, such as, for example, DDT. Because those chlorinated wastes present an environmental hazard, they are normally incinerated.

In the incineration of the usual chlorinated organic wastes, the chlorine is converted mainly to hydrogen chloride, which is scrubbed with water. However, a portion or organic chlorine forms molecular chlorine, $Cl_2$, which is much less soluble in water than HCl and is not scrubbed efficiently. Some gaseous chlorine is thus present in the flue gas. The presence of this pollutant in the flue gas is, of course, undesirable.

The efficiency of chlorine conversion to hydrogen chloride can be improved, for example, by injection of superheated steam into the incineator's combustion zone. This prior art method suffers from the drawback that steam injection into the combustion zone tends to lower the incinerator's temperature, so that additional energy is required to maintain the required temperature level. Furthermore, the presence of steam in the combustion zone reduces the effective volume of the incinerator and thus its throughput. Finally, it accelerates corrosion and breakdown of incinerator materials, including the refractory lining of the combustion zone.

It can be readily seen that more efficient methods of incinerating chlorinated organic materials are desired.

SUMMARY OF THE INVENTION

According to the process of the present invention, air and chlorinated organic materials containing about 20 to 70% of chlorine (preferably, about 20 to 55%) are continuously introduced into the combustion zone of an incinerator whose walls are maintained at a temperature of about 800°-1500° C.; the gaseous combustion products are introduced into a quench zone which is cooled by an aqueous hydrochloric acid spray; and at least one $C_1$-$C_4$ hydrocarbon gas is injected into the quench zone at one or more points where the temperature is within the range of approximately 450°-1000° C.; the amount of air introduced into the combustion zone being such that there is an excess of oxygen of about 1-40% over the theoretical quantity required to fully burn the organic materials by converting all carbon atoms to carbon dioxide, allowing all chlorine atoms and sufficient hydrogen atoms to combine to hydrogen chloride, and converting all hydrogen atoms remaining after formation of hydrogen chloride to water; and the amount of hydrocarbon that is injected into the quench zone is expressed by the equation $Z = Y \cdot m/n$, where Z is the volume percent of the hydrocarbon based on the volume of air fed into the combustion zone, and Y is an empirical value, within the range of 0.2 to 2.0; m is the volume percent of oxygen in the quench zone based on all the gases present in the quench zone but excluding water vapor and hydrogen chloride gas; and n is the number of atoms of hydrogen in the hydrocarbon molecule. The preferred value for Y is 0.8 to 1.2.

SHORT DESCRIPTION OF THE DRAWING

The drawing schematically represents a waste incinerator and indicates the movement of materials through it.

DETAILED DESCRIPTION OF THE INVENTION

It is generally known that molecular chlorine can be converted to hydrogen chloride by hydrogen or hydrocarbons in a reducing atmosphere. However, it is not generally known that this can be accomplished in the presence of air or oxygen. Yet, the process of this invention, which is usually carried out in the presence of a small excess of air, does very efficiently convert molecular chlorine to hydrogen chloride, which can be scrubbed with water. While the most efficient chlorine removal occurs when the Y values are within the preferred range of 0.8 to 1.2, and adequate chlorine removal still occurs within the broad range of 0.2 to 2.0, some chlorine removal may also occur when the flow of the hydrocarbon is reduced in such a way that Y is less than 0.2. This modification would not be expected to satisfy most environmental standards. Increasing the flow of the hydrocarbon so that Y is larger than 2.0 is not considered practical because excess hydrocarbon is simply wasted. However, chlorine is removed very efficiently at those high rates.

Referring now to the Drawing, a suitable incinerator consists of the combustion zone A, the quench zone B, and the exhaust duct or flue, C. The chlorinated organic material is introduced into the combustion zone A through line 1, and air is introduced through line 2. The combustion zone is lined with a refractory material, such as, for example, firebrick. The flame temperature in the center of zone A is estimated to be about 2000°-2500° C., but the measured wall temperature is approximately 800°-1500° C. The necessary temperature is obtained by burning the chlorinated material itself, but this can be supplemented by burning therein a hydrocarbon, such as, for example, natural gas or liquid propane. Zone B, which communicates with zone A, may be constructed, for example, of refractory brick, ceramic-lined steel, or any other suitable acid-resistant material. The typical incinerator will have, as shown on the drawing, a vertical configuration, zone A being situated above zone B. Several generally parallel rows of openins are located on the periphery of zone B. These are used principally for the injection of the quenching hydrochloric acid solution, but some of the openings are used for the introduction of hydrocarbon gas according to the process of this invention. There is a decreasing temperature gradient in the downward direction in zone B, and the hydrocarbon is introduced through the openings located in the highest row, D, where the temperature is approximately 1000° C. Other rows are indicated by E and F. The spacing between the rows is such that efficient cooling is obtained; for example, row D can be 50 cm below the top of zone B, row E 90 cm below row D, and row F 90 cm below row E and 386 cm from the bottom of zone B. The quench zone represented in this schematic drawing is cylindrical and has an inside diameter of 133 cm.

Liquid coolant is sprayed into zone B through nozzles inserted in the openings E and F as well as some of the openings D. The gaseous mixture exiting through duct C (hereafter, flue gas) has a temperature of approximately 100°–200° C. Duct C is located above the bottom of zone B; for example, the distance from the center of duct C to the bottom of zone B shown in the drawing is 155 cm.

Under normal operating conditions, the flow rate of flue gas in an incinerator having a quench zone of the above dimensions is about 0.79–1.98 m³/sec, and the residence time of the gas in the quench zone is about 0.34–1.05 seconds.

The coolant, which initially is a dilute aqueous hydrochloric acid, continues to dissolve some additional hydrogen chloride present in the quench zone B and accumulates on the bottom of zone B. It then is recirculated by a pump and pipe system, not shown, to various spray nozzles in openings D, E, and F. Advantageously, this accumulated coolant is first pumped to a holding tank, not shown, and thence to the nozzles. As the coolant is repeatedly recirculated, the concentration of HCl in this solution gradually increases to a point where further HCl absorption is not sufficiently efficient. At that point, this solution is either sent to disposal or recovered for other uses.

The hydrocarbon gases suitable in the present invention are methane, ethane, propane, n-butane, isobutane, and any mixtures of the above. The proper choice will depend to a large extent on the hydrocarbon gas availability at a given plant location. Thus, in some locations natural gas (i.e., mainly methane) is available and will be preferred, while in others liquid propane or mixtures thereof with butane can be readily obtained. Mixtures of low molecular weight hydrocarbons are often available as byproducts of petroleum cracking. Methane is the cheapest hydrocarbon gas. Propane and butane crack quite readily at high temperatures to form hydrogen.

It is recognized that hydrogen can be used instead of a hydrocarbon in the quench zone, but it is believed that the hydrocarbon offers significant advantages over hydrogen because it is cheaper on equimolar basis, since it contains more hydrogen atoms, thus allowing more efficient chlorine removal per given volume. Furthermore, a hydrocarbon can be handled with a much higher safety margin.

This invention is now illustrated by the following example of a preferred representative embodiment thereof.

EXAMPLE

Chlorinated organic wastes containing approximately 35 weight % of chlorine were incinerated in an apparatus substantially as schematically shown in the drawing. Control runs, without methane injection gave the base values of residual molecular chlorine (determined by first trapping HCl from the gas stream, then converting molecular chlorine to chloride ions in a caustic/arsenite scrubber and determining Cl⁻ by a standard titration technique). Injection of methane into the quench zone in the amounts shown reduced the molecular chlorine values as shown in Table I. Volume percentage of oxygen in the quench zone (m) was measured both before and after methane injection.

TABLE I

| | Run | | | |
|---|---|---|---|---|
| | A | B | C | D |
| Burner wall temp. (°C.) | 1400 | 1440 | 1380 | 1350 |
| Volume percentage of oxygen (m) without methane | 2.2 | 2.0 | 2.6 | 2.6 |
| Residual $Cl_2$ (mg/m³)* - Control | 22 | 41 | 373 | 692 |
| Volume percentage of oxygen (m) with methane | 1.6 | 1.5 | 2.3 | 2.0 |
| Residual $Cl_2$ (mg/m³)* - with methane | 3 | 5 | 22 | 53 |
| Y (calculated from actual gas flow values) | 1.0 | 1.08 | .84 | .84 |

*$Cl_2$ precision ± 20%

The above results show that addition of methane to the quench zone in a preferred amount decreases the proportion of molecular chlorine in the flue gas by about 86–94%.

COMPARATIVE EXAMPLE

When an amount of methane was injected into the combustion zone, rather than into the quench zone, the amount of residual molecular chlorine was not decreased, as shown in Table II.

TABLE II

| | Run | |
|---|---|---|
| | A | B |
| Burner wall temp (°C.) | 1400 | 1380, 1420** |
| Volume percentage of oxygen (m) | 2.8 | 2.4 |
| Residual $Cl_2$ (mg/m³)-control | 291 | 1350 |
| Residual $Cl_2$ (mg/m³) | 416 | 1400 |
| Y (calculated from actual gas flow values) | 1.16 | 1.32 |

**Two burners were feeding a single stack

We claim:

1. A process for the incineration of chlorinated organic materials containing about 20–70% of chlorine, wherein air and said materials are continuously introduced into the combustion zone of an incinerator whose walls are maintained at a temperature of about 800°–1500° C.; the gaseous combustion products are introduced into a quench zone which is cooled by aqueous hydrochloric acid spray; and at least one $C_1$–$C_4$ hydrocarbon gas is injected into the quench zone at one or more points where the temperature is within the range of approximately 450°–1000° C.; the amount of air introduced into the combustion zone being such that there is an excess of oxygen of about 1–40% over the theoretical quantity required to fully burn the organic materials by converting all carbon atoms to carbon dioxide, allowing all chlorine atoms and sufficient hydrogen atoms to combine to hydrogen chloride, and converting all hydrogen atoms remaining after formation of hydrogen chloride to water; and the amount of hydrocarbon that is injected into the quench zone is expressed by the equation $Z = Y \cdot m/n$, where Z is the volume percent of the hydrocarbon based on the volume of air fed into the combustion zone, and Y is an empirical value, within the range of 0.2 to 2.0; m is the volume percent of oxygen in the quench zone based on all the gases present in the quench zone but excluding water vapor and hydrogen chloride gas; and n is the number of atoms of hydrogen in the hydrocarbon molecule.

2. The process of claim 1 wherein Y is 0.8 to 1.2.

3. A process of claim 1 wherein the combustion zone and the quench zone are placed in a substantially vertical arrangement in which the combustion zone is above the quench zone.

4. A process of claim 1 wherein the aqueous hydrochloric acid sprayed into the quench zone is collected at the bottom of the quench zone and recirculated back to the spray points so long as it is capable to efficiently absorb hydrogen chloride.

5. A process of claim 1 wherein the chlorine content of the organic materials is about 20–55%.

6. A process of claim 5 wherein the hydrocarbon gas is natural gas or methane.

7. A process of claim 5 wherein the hydrocarbon gas is propane or a mixture thereof with butane.

* * * * *